Sept. 5, 1967    N. BERKOWITZ ETAL    3,339,984
PUMP BYPASS METHOD AND APPARATUS FOR PIPELINE
TRANSPORTATION SYSTEMS
Filed Jan. 21, 1966    4 Sheets-Sheet 1
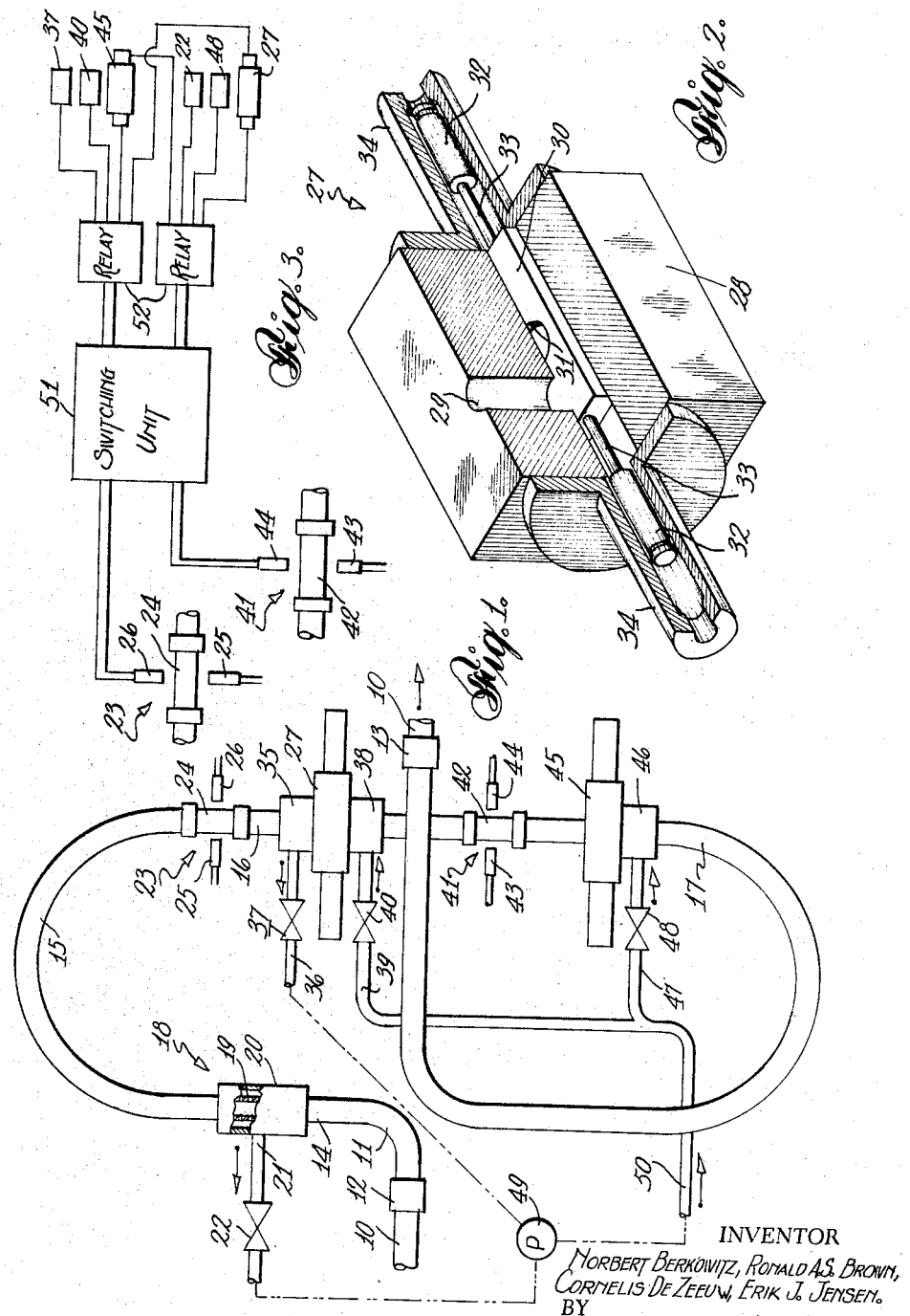
INVENTOR
NORBERT BERKOWITZ, RONALD A.S. BROWN,
CORNELIS DE ZEEUW, ERIK J. JENSEN.
BY
PATENT AGENT

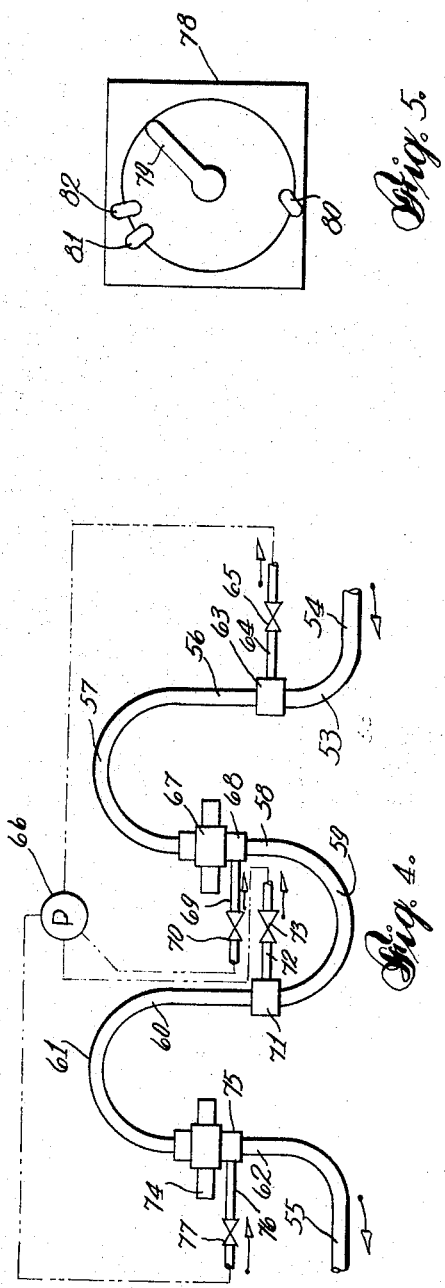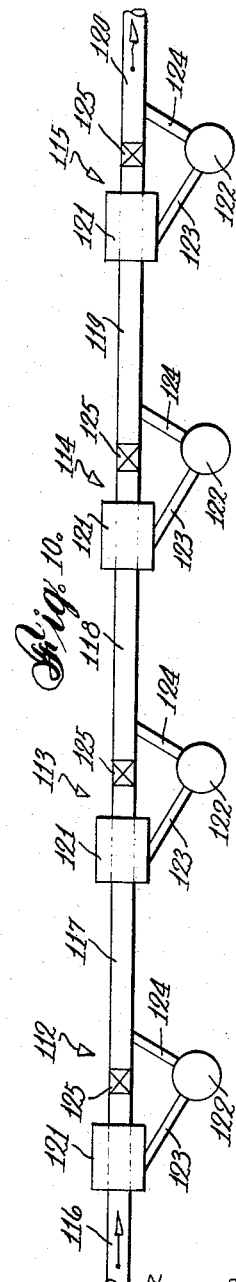

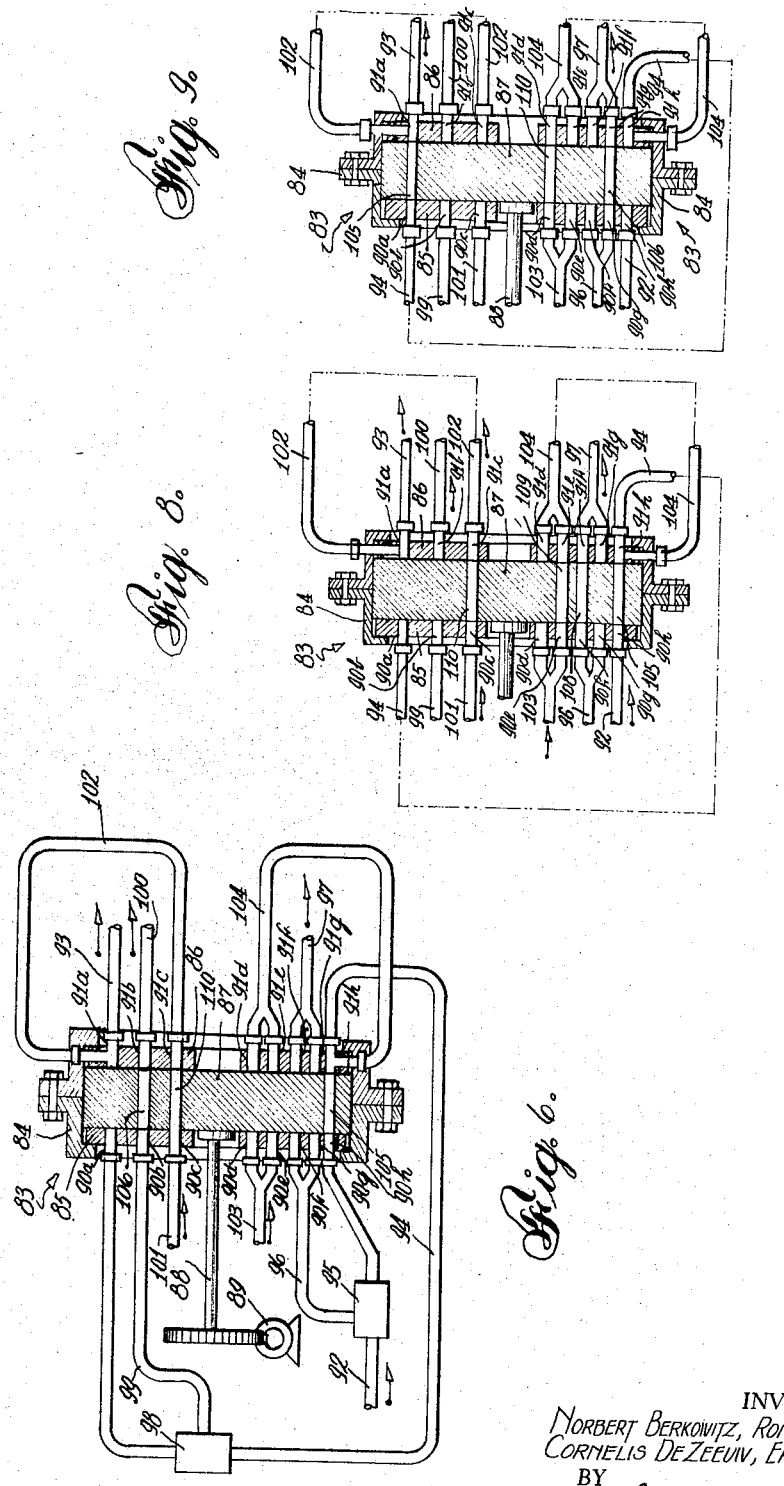

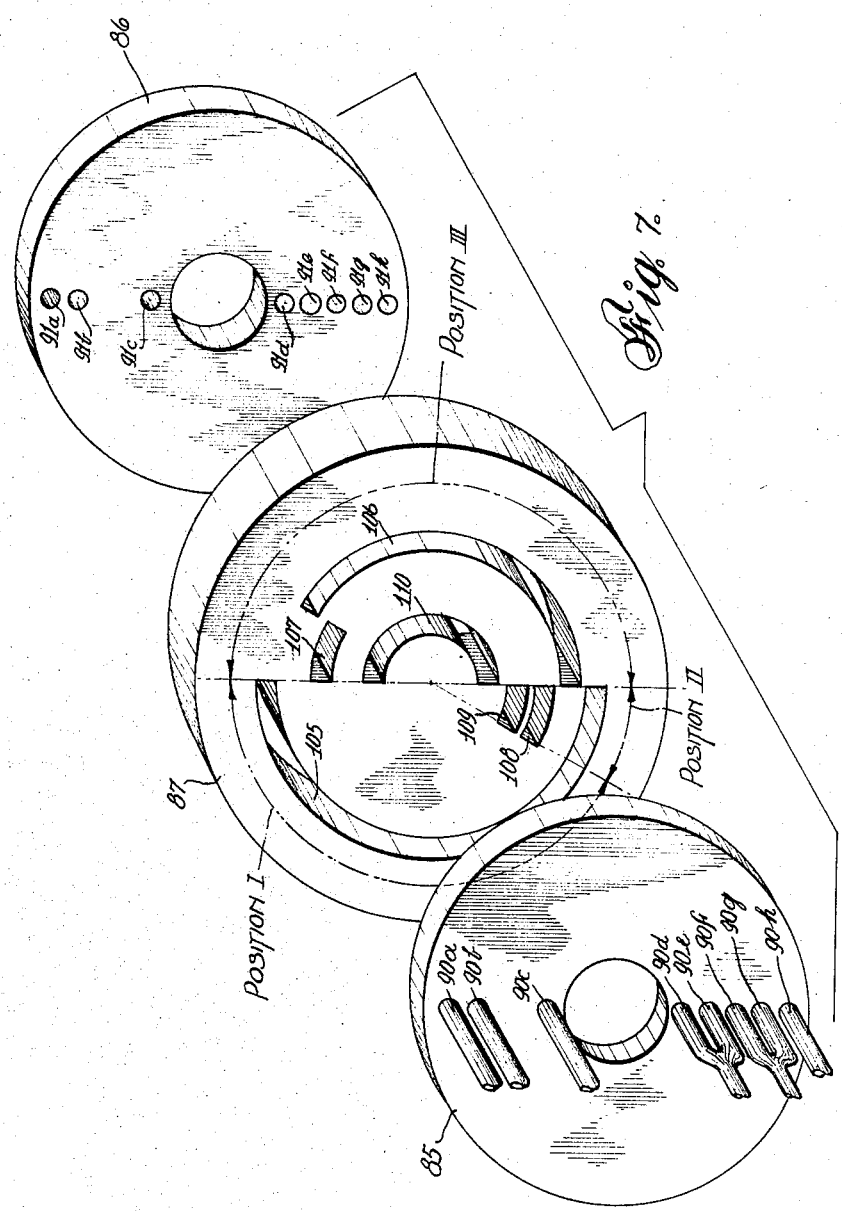

United States Patent Office 3,339,984
Patented Sept. 5, 1967

3,339,984
PUMP BYPASS METHOD AND APPARATUS FOR PIPELINE TRANSPORTATION SYSTEMS
Norbert Berkowitz, Ronald A. S. Brown, Cornelis De Zeeuw, and Erik J. Jensen, Edmonton, Alberta, Canada, assignors, by mesne assignments, to the Research Council of Alberta, Edmonton, Alberta, Canada, a body corporate
Filed Jan. 21, 1966, Ser. No. 522,243
3 Claims. (Cl. 302—14)

ABSTRACT OF THE DISCLOSURE

A pipeline for transporting solid bodies in a main fluid stream is provided with a pumping system by-passed by the solid bodies which could not be effectively passed through the pump of the system. The system includes a pipe section having means for supplying a body-free stream portion to the pump inlet, the pump having a discharge outlet in the pipeline. The pipe section has a plurality of vertically extending portions with sensing means responsive to passage of bodies in such portions. The sensing means act to operate a series of valves in the pipe section.

---

This invention relates to apparatus for bypassing the solid bodies being transported in a fluid medium in a pipeline around the pumps employed to propel such fluid medium.

It has heretofore been proposed to employ a pipeline to transport various solid bodies, such as capsules or slugs containing a body to be transported, using a fluid as the carrier medium. In the long distance transportation of such bodies, pumping stations as integral parts of the pipeline are necessary to maintain a given flow velocity. Capsules or slugs of a size suitable for economical pipeline transportation cannot be passed through conventional pumps without detrimental effects on the pump and the capsules or slugs.

It is an object of this invention to provide a satisfactory and effective means for bypassing slugs or capsules around a pump in a pipeline in such manner that maximum pump capacity is maintained and no damage is done to the capsules and slugs, thereby achieving smooth and efficient operation of the pipeline.

A broad aspect of the apparatus comprises means for applying pumping action to a main fluid stream containing solid bodies being transported in a pipeline which comprises a pipe section in said pipeline having means therein for withdrawing a body-free stream portion comprising a perforated length of said pipe section, and a cylindrical mantle enclosing said perforated length, and a pump having an intake communication with the interior of said mantle and a discharge communicating with said pipe section. The pipe section has first, second, third and fourth vertically extending portions, the withdrawing means being located in the first portion. There is also provided a first valve in the second portion, a second valve in the fourth portion, a second withdrawing means in the third portion, a pump intake leading from the second withdrawing means, a third valve in the first pump intake, a fourth valve in the second pump intake, the pump discharge having a first branch leading to the second portion below the first valve and a second branch leading to the fourth portion below the second valve, a fifth valve in the first branch, a sixth valve in the second branch, and means for closing and opening the second, third, and fifth valves as a group and the first, fourth and sixth valves as a group.

The invention will be described with reference to the accompanying drawings, in which FIGURE 1 is a side elevation of an apparatus in accordance with the invention,
FIGURE 2 is a perspective view, partly in section of a valve employed in the apparatus,
FIGURE 3 is a block diagram of the electrical connections of the apparatus,
FIGURE 4 is a side elevation of a modified form of apparatus,
FIGURE 5 is a plan view, in diagrammatic form, of a switch means employed in the modification of FIGURE 4,
FIGURE 6 is a side elevation, partly in section, of another modified form of apparatus,
FIGURE 7 is an exploded perspective view of a flow switching device employed in the modification of FIGURE 6,
FIGURES 8 and 9 are sectional views showing varying positions of the switching device, and
FIGURE 10 is a side elevation, in diagrammatic form, of still another modified form of apparatus in accordance with the invention.

Referring to FIGURES 1, 2 and 3, the apparatus shown is adapted to be inserted in a pipeline 10, flow in which is from left to right as indicated by the arrows in FIGURE 1.

The device comprises a pipe 11 having its intake end connected to the pipeline at 12 and its outlet end connected to the pipeline at 13. The pipe 11 has a vertically upwardly extending section 14 leading from its intake end, an 180° curved section 15, a vertically downwardly extending section 16, and a section 17 connecting the lower end of section 16 with the pipeline connection 13.

A device 18 is provided in pipe section 14 for withdrawing liquid therefrom and comprises a perforated portion 19 of section 14, a housing or mantle 20 surrounding such portion 19, and an outlet pipe 21 having a solenoid-operated valve 22 therein, leading from mantle 20.

Means for detecting passage of a solid body through the pipe is provided in the upper portion of section 16 and comprises a sensing device 23. Any suitable sensing device may be employed. Thus, it may be of dielectric or photoelectric type or employ signal sources based on conductivity, radioactivity, pressure changes, electromagnetic fields, and the like. It will be apparent that circumstances, and conditions of the particular transportation system involved will have a bearing on the choice of sensing device. That shown by way of example is of the photoelectric type and comprises a transparent portion 24 of the pipe, a light source 25, and a photoelectric cell 26.

Following sensing device 23 in pipe section 16 is a solenoid-operated valve 27, the structure of which is shown in FIGURE 2. This valve comprises a housing 28 having a passage 29 extending therethrough in alignment with and communicating with pipe section 16. Means for opening and closing passage 29 comprises a metal bar 30 (preferably non-ferrous) slidably mounted in the housing and having an opening 31 therein movable into and out of registry with passage 29. An iron cylinder 32 is attached to each end of bar 30 by means of a rod 33. Each cylinder is reciprocally mounted in a metal (non-ferrous) tube 34 fixed to the adjacent end of the housing. The tubes 34 serve as supports for the solenoids (not shown). It will be apparent that valve 27 is of the full flow, full opening type. It has very fast operation even at very high pressure differentials.

Immediately above valve 27 and between it and sensing device 23 means are provided for withdrawing liquid from the pipe 11 and comprises a device 35 (similar to device 18), and an outlet pipe 36 leading therefrom and having a solenoid-operated valve 37 therein.

Immediately below valve 27 is means for returning fluid to the pipe 11 and comprises a device 38 (also similar to device 18) and an inlet pipe 39 with solenoid-operated valve 40 therein.

Following device 38 in pipe section 16 is a second sensing device 41 which may comprise a transparent pipe portion 42, a light source 43 and a photoelectric cell 44.

Following sensing device in pipe section 16 is a valve 45 which is similar in structure to valve 27.

Immediately below valve 45 in pipe section 16 is a device 46 (also similar to device 18) for returning fluid to the pipe 11, such device having an inlet pipe 47 with solenoid-operated valve 48 therein.

Pipes 21 and 36 are connected to the intake of a pump 49, the outlet of which is connected to pipes 39 and 47 by a pipe 50.

Valves 22, 37, 40 and 48 are conventional solenoid-operated valves.

Referring to FIGURE 3, the sensing devices 23 and 41 are connected to a switching unit 51, which may be a silicon controlled rectifier, in which the signal induced by the passing slugs or capsules is amplified and routed to relays 52 which in turn operate the valves 22, 27, 37, 40, 45 and 48.

In operation, with no solid bodies present in the pipe 11, valves 37, 40 and 45 are open and valves 48, 22 and 27 are closed. Thus, fluid leaves the pipeline immediately above valve 27, passes through the pump and re-enters the line immediately below valve 27.

Considering now the case where one capsule or slug enters pipe 11, it will be propelled therethrough but when it passes the sensing device 23, the latter is designed to open valves 48, 22 and 27 and to close valves 37, 40 and 45, this operation being completed in a fraction of a second. Fluid now leaves the pipeline through 21 and re-enters through 47. Flow due to the pump is suspended in the line between 18 and a point immediately above valve 45. The capsule or slug moves due to inertia and gravity down through valve 27. When it passes sensing device 41, the latter reverses the position of the valves, opening vales 37, 40 and 45, and closing valves 48, 22 and 27. The capsule or slug now moves on through pipe section 17 and back into the pipeline 10.

Consider, finally, the common case where capsules or slugs, more or less regularly spaced, continuously enter the bypass system. With valves 37, 40, 45 open and valves 48, 22, 27 closed, the first capsule or slug passing sensing device 23 will cause valves 37, 40, 45 to close and valves 48, 22, 27 to open. All capsules or slugs located at that moment between the top bend 15 and sensing device 23 will move through valve 27. Those located between device 18 and the top bend 15 will slide back towards device 18 until they are stacked above this device where they will be held due to the effect of the device. The function of device 18 is quite important. When fluid leaves the pipeline via the perforations 19 and mantle 20, turbulence will be created in the fluid in the pipe, and capsules or slugs located between the top bend and the device 18 will remain there riding on top of such turbulence. Capsules or slugs entering the pipe 11 while bypassing occurs will remain in portion 19 until the valve positions are reversed.

When the first capsule or slug passes sensing device 41, the valves are reversed and the bypassed train moves on into the pipeline through 17. The lengths of elements 15, 23 and 27, 41 are so chosen that none of the slugs in the train being by-passed are trapped in valve 27.

Device 18 is suitably constructed to achieve its desired function. Thus, for a one inch diameter pipeline and pipe 11, a mantle 20 four inches in diameter and about eight inches long is satisfactory. The perforations may be $3/16$ inch in diameter and are distributed uniformly throughout the portion 19. The total area of the perforations is 10-20% larger than the area of a cross-section of the pipe 11.

The modification shown in FIGURES 4 and 5 comprises a pipe 53 having an inlet section 54 and an outlet section 55 for connection to a pipeline. The pipe has a plurality of successive sections consisting of a vertically upwardly extending section 56, a top bend 57, a downwardly extending section 58, a bottom bend 59, a vertically upwardly extending section 60, a top bend 61, and a downwardly extending section 62.

Section 56 has a device 63 (similar to 18) for withdrawing fluid from the system and including a pipe 64, with solenoid-operated valve 65 therein, connected to pump 66.

Section 58 has therein a solenoid-operated valve 67, similar to valve 27, and immediately below valve 67 means for returning fluid to the pipe comprising a device 68 (similar to 18), a pipe 69, with a valve 70, connected to the pump.

Section 60 has in the lower portion thereof means for withdrawing fluid from the system comprising a device 71 (similar to 18) and a pipe 72, with valve 73, connected to the pump.

Section 62 has therein a solenoid-operated valve 74 (similar to 27) and immediately below such valve 74 means for returning fluid to the line comprising a device 75 (similar to 18) and a pipe 76, with valve 77, connected to the pump.

In this modification, instead of sensing devices, a rotating three-position switch, as shown at 78 in FIGURE 5, is employed to operate the valves in a fixed sequence. The switch is of conventional variable speed type. Thus, the speed of switching can be adjusted to match the traffic of solid bodies in the pipeline. The switch has a rotating contact arm 79 and three contact points 80, 81 and 82.

In operation, considering the instance where a train of capsules or slugs enters the bypass system from the pipeline, contact arm 79 has just made contact at 80, which effects closing of valves 65, 70 and 74 and opening of valves 73, 77 and 67. The train thus passes freely through the pipe until it reaches device 71 or slightly above it where it is stopped because of the withdrawal of fluid by pipe 72 and the suspension of flow in sections 60 and 61.

The contact arm then makes contact at 81, which effects opening of 65, 70, 77, 67 and closing of 73, 74. The train of capsules or slugs at this time may extend all the way back through 67 and 63 and into the pipeline itself. Any bodies located in 67 will either be pushed back towards 63 (spacing between bodies is diminished and therefore no backwards movement of the train as such takes place), or forward (by gravity) through 71 towards 74. Thus, 67 is cleared of solid bodies and no such bodies can be trapped in this valve when the next phase is executed. The duration of this separation is very short as indicated in the diagram of the rotating switch. Valve 77 is kept open in order to maintain flow in the line.

When the contact arm makes contact at 82 it effects opening of valves 65, 70, 74 and closing of 73, 77, 67. The train, separated as described, moves through valve 74 and returns to the pipeline to complete the bypassing procedure. Valve 65 is held open to prevent the incoming train from the pipeline from crowding valve 67.

The contact arm then again makes contact at 80 and the operation proceeds as previously described.

As will be noted, the location of the traffic regulator (device 63, similar to 18), in combination with the switching cycle of switch 78, completely eliminates the possibility of trapping solid bodies in valve 67 at the time this valve is operated. A similar arrangement is superfluous with respect to valve 74. The train passing through this valve is of known length and contact points 80 and 82 on the switch are positioned so that ample time is allowed to empty the section between valves 67 and 74 without risk of trapping any capsules or slugs in 74.

The modification of FIGURES 6 to 9 was designed to remove the need for the provision of valves of fast acting nature (fast in this context means less than one second to change from fully closed to fully open position). This modification operates on a timed cycle principle and employs the separation phase of the modification of FIGURE 4. It does not, however, use any valves.

The essential feature of this modification resides in the provision of a flow switching device 83 which comprises a housing 84 having circular side walls 85 and 86 and a disk 87 rotatably mounted therebetween. Any suitable fluid sealing means is provided between the contacting surfaces of walls 85 and 86 and disk 87. The disk 87 is rotated at desired speed by means of an axial shaft 88 and variable speed motor 89.

Wall 85 has therein a series of holes 90a to h arranged in a vertical plane. Wall 86 also has therein a series of holes 91a to h, each in axial alignment with a corresponding hole 90a to h.

As in the other modifications, the apparatus is adapted to be inserted in a pipeline, pipe 92 being the inlet connection from the pipeline and pipe 93 being the outlet connection therewith.

Pipe 92 is connected to hole 90h and the axially opposite hole 91h is connected by a pipe loop 94 with hole 90a. Pipe 93 is connected to the opposite hole 91a.

Pipe 92 has therein means for withdrawing fluid from the system comprising a device 95 (similar to device 18) and pipe 96 connected to holes 90e and 90f. Opposite holes 91e and 91f are connected to the inlet of the pump (not shown) by pipe 97.

Pipe loop 94 also has means therein for withdrawing fluid which comprises a device 98 (similar to 18), pipe 99 connected to hole 90b, and pipe 100 connected to opposite hole 91b and the suction side of the pump.

The outlet of the pump is connected by pipe 101 to hole 90c, the opposite hole 91c being connected to hole 91a by a pipe loop 102.

The outlet of the pump is also connected by a pipe 103 to holes 90d and 90e, the opposite holes 91d and 91e being connected to hole 91h by a pipe loop 104.

Disk 87 has a plurality of concentric, arcuate slots 105, 106, 107, 108, 109 and 110.

As the disk 87 rotates it will successively provide three operating positions of the apparatus, and will continue to provide these three positions in sequence. These positions I, II and III, are shown in FIGURES 6, 8 and 9, respectively.

Assuming the apparatus is in position I (FIGURE 6), fluid flow enters through pipe 92 and continues through pipe 94. Traffic control device 98 is in operation since pipe 99 is connected to the pump and return from the pump flows through pipes 101 and 102 to the pipeline through pipe 93. This is made possible because pipes 99 and 100 are connected through slot 106, pipes 101 and 102 are connected through slot 110, and pipes 92 and 94 are connected through slot 105. The remaining holes 90a, 90d, 90e, 90f and 90g are disconnected from the opposite holes 91.

A train of capsules entering pipe 92 is propelled by fluid entering the pipeline from the pump at pipe 101. The fluid leaves the line through the mantle of the traffic regulator 98. The train passes through regulator 95 and pipe 94 but is stopped in or slightly above regulator 98.

The disk 87, moving clockwise, changes to position II of FIGURE 8. In this position, pipe 92 is connected to pipe 94 through slot 105, pipe 96 is connected to pipe 97 through holes 90f, 91f, and slot 108, pipe 103 is connected to pipe 104 through holes 90e, 91e, and slot 109, and pipe 101 is connected to pipe 102 through slot 110. The remaining holes 90a, 90b, 90d, 90g are disconnected from the opposite holes 91.

Fluid propelling the flow in the main pipeline flows from the pump through pipes 101 and 102 to pipeline connection 93. Fluid to the pump flows from device 95 via pipes 96 and 97.

Another flow of fluid from the pump enters pipe 103 and flows through pipe 104 towards device 95 thus clearing the disk slot 105 of any solid bodies located there. This fluid returns to the pump through the mantle of device 95. In this manner the train of solid bodies is separated. The duration of this separation phase is quite short.

The disk 87 now moves to position III of FIGURE 9. Fluid enters the main pipeline from the pump at 103, slot 110, pipe 104, pipe 94 slot 105, and pipe 93. It thus moves the train stationed in and prior to device 98, through the disk and into the pipeline. The fluid leaves the main pipeline through the mantle of device 95, pipe 96, slot 106, and pipe 97 to the pump. In this way the incoming train of solid bodies at pipe 92 is prevented from crowding against the disk.

The disk 87 now returns to position I and the cycle is repeated.

This modification is particularly well adapted to large diameter pipeline operation because of the absence of valves.

Referring to FIGURE 10, there is illustrated therein a simplified bypass system which is readily adaptable to existing pipelines at low cost.

A plurality of pumping stations 112, 113, 114, 115 are provided in a pipeline having successive sections 116, 117, 118, 119, 120. Each pumping station comprises a traffic regulating device 121 (similar to device 18) and a pump 122 having its inlet line 123 connected to the mantle of device 121, and its outlet line 124 connected to the pipeline section downstream of the device 121. A fast operating, full flow valve 125 is placed in the pipeline between the pump connections. It is advantageous, but not essential, that the pumping stations be equidistant apart. The shortest distance between adjacent pumping stations determines the length of trains of solid bodies that can be accommodated in the pipeline. Any suitable electronic means may be employed to operate the pumping stations in desired sequence.

In operation, it is assumed that a train of solid bodies approximately the length of the shortest distance between pumping stations is located on either side of station 112 in sections 116 and 117. Another similar train is located on either side of station 114 in sections 118 and 119, and so on around each alternate station along the line. Valves 125 of stations 112, 114, etc., are open and valves 125 of stations 113, 115, etc., are closed. Pumps 122 of stations 113, 115, etc., are operating and pumps 122 of stations 112, 114, etc., are stopped. The trains thus move towards the traffic regulators 121 of stations 113, 115, etc., and the first capsules or slugs to arrive will be held there since fluid is returned to the pumps through the mantles of the regulators. When the last solid bodies have cleared all the valves of stations 112, 114, etc., the valves along the line change positions from open to closed and vice versa. The active pumps stop at the same time the idle ones start propelling fluid. Thus, the trains of solids move on into new sections of the pipeline. By alternating this procedure, the trains are conveyed along the length of the line to their destination.

The frequency of the shifts is low in an average line. For example, in a line moving at a fluid velocity of 6 ft./sec. and having a minimum distance between pumping stations of 100 miles, the valves and pumps will need to be alternated only once every 25 hours (in this calculation trains of 90 miles are considered).

The linear line fill in this system can of necessity never exceed 50% and may be about 45% depending upon the shortest distance between pumping stations and the average spacing between individual capsules or slugs and the time necessary to change valve 125.

This system lends itself to the concept of a common carrier pipeline. The trains are separated at all times and can never be mixed. The distance between them allows ample time to separate individual trains at the receiving end of the line. The trains do not therefore need to be made up of identical solids. The maximum number of

We claim:

1. Apparatus for applying pumping action to a main fluid stream containing solid bodies being transported in a pipeline which comprises a pipe section in said pipeline comprising a loop having a vertically upwardly extending first portion and a vertically downwardly extending second portion, said pipe section having means in said first portion for withdrawing a body-free stream portion comprising a perforated length of said pipe section, and a cylindrical mantle enclosing said perforated length, a pump having an intake communicating with the interior of said mantle and a discharge communicating with said pipe section, said second portion having a first solid body sensing device, a first valve therein below said first sensing device, a second solid body sensing device, and a second valve below said second sensing device, said pump intake having a third valve therein, a second pump intake leading from said second portion immediately above said first valve, a fourth valve in said second intake, said pump discharge having a first branch leading to said second portion immediately below said first valve and a second branch leading to said second portion below said second valve, a fifth valve in said first branch, a sixth valve in said second branch, said second, fourth and fifth valves being normally open and said first, third and sixth valves being normally closed, means responsive to energization of said first sensing device for closing said second, fourth and fifth valves and opening said first, third and sixth valves, and means responsive to energization of said second sensing device for opening said second, fourth and fifth valves and closing said first, third and sixth valves.

2. Apparatus for applying pumping action to a main fluid stream containing solid bodies being transported in a pipeline which comprises a pipe section in said pipeline having first, second, third and fourth vertically extending portions, means in said first portion for withdrawing a body-free stream portion comprising a perforated length of said pipe section, and a cylindrical mantle enclosing said perforated length, a pump having an intake communicating with the interior of said mantle and a discharge communicating with said pipe section, a first valve in said second portion, a second valve in said fourth portion, a second withdrawing means in said third portion, a pump intake leading from said second withdrawing means, a third valve in said first pump intake, a fourth valve in said second pump intake, said pump discharge having a first branch leading to said second portion below said first valve and a second branch leading to said fourth portion below said second valve, a fifth valve in said first branch, a sixth valve in said second branch, and means for closing and opening said second, third, and fifth valves as a group and said first, fourth and sixth valves as a group.

3. Apparatus for applying pumping action to a main fluid stream containing solid bodies being transported in a pipeline which comprises a pipe section in said pipeline having means therein for withdrawing a body-free stream portion comprising a perforated length of said pipe section, and a cylindrical mantle enclosing said perforated length, a pump having an intake communicating with the interior of said mantle and a discharge communicating with said pipe sections, and a flow switching device comprising a housing having first, second, third, fourth, fifth and sixth inlets and an outlet in axially aligned relation with each of said inlets, and a rotatably mounted disc in said housing between said inlets and outlets, said disc having slots therein for placing each of said inlets in communication with the opposite one of said outlets, said pipe section having an inlet portion communicating with said first inlets, said withdrawing means being located in said inlet portion, said second inlet and outlet being located in said pump intake, said pump discharge having two branches, said third inlet and outlet being located in one of said branches and said fourth inlet and outlet being located in the other of said branches, a loop in said pipe section communicating with said first outlet and with said fifth inlet, a second withdrawing device in said loop, a second pump intake leading from said second device, said sixth inlet and outlet being located in said second intake, said pipe section having an outlet portion communicating with said fifth outlet, a loop communicating with said fifth outlet and said fourth outlet, and a loop communicating with said first and third outlets.

References Cited
UNITED STATES PATENTS

| | | | |
|---|---|---|---|
| 3,198,581 | 8/1965 | Gamberini | 302—2 |
| 3,212,822 | 10/1965 | Payne et al. | 302—14 |
| 3,254,924 | 6/1966 | Harrison et al. | 302—14 |
| 3,290,220 | 12/1966 | Mitault et al. | 302—14 |

ANDRES H. NIELSEN, *Primary Examiner.*